Nov. 26, 1929.   K. R. J. LAGUS   1,736,924
BARK REMOVING MACHINE
Filed July 14, 1927   2 Sheets-Sheet 2
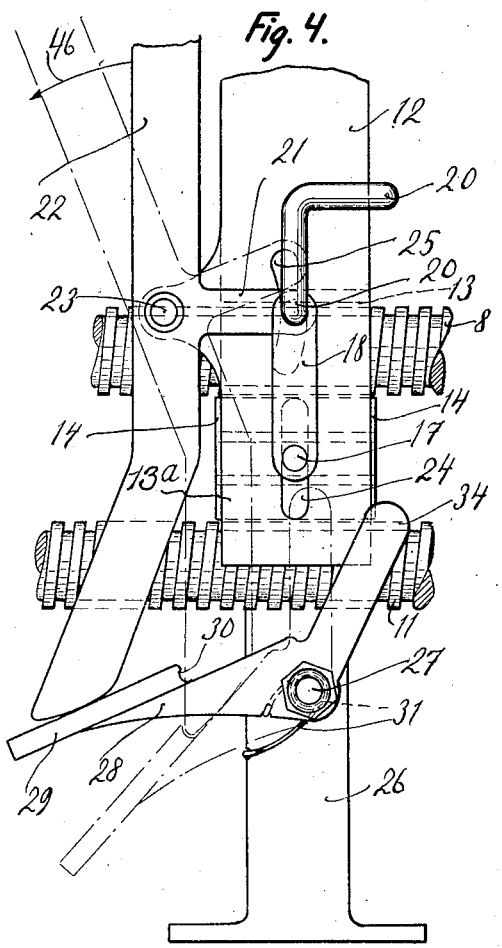
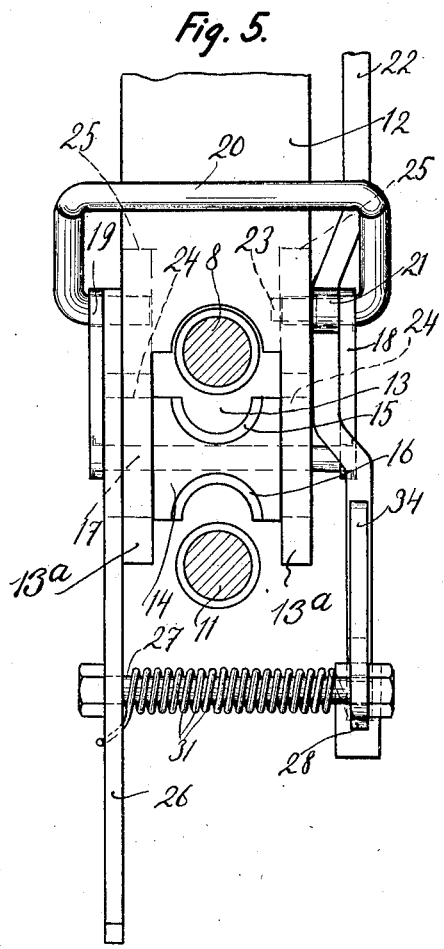
K. R. J. Lagus
INVENTOR
By: Marks & Clerk Patented Nov. 26, 1929

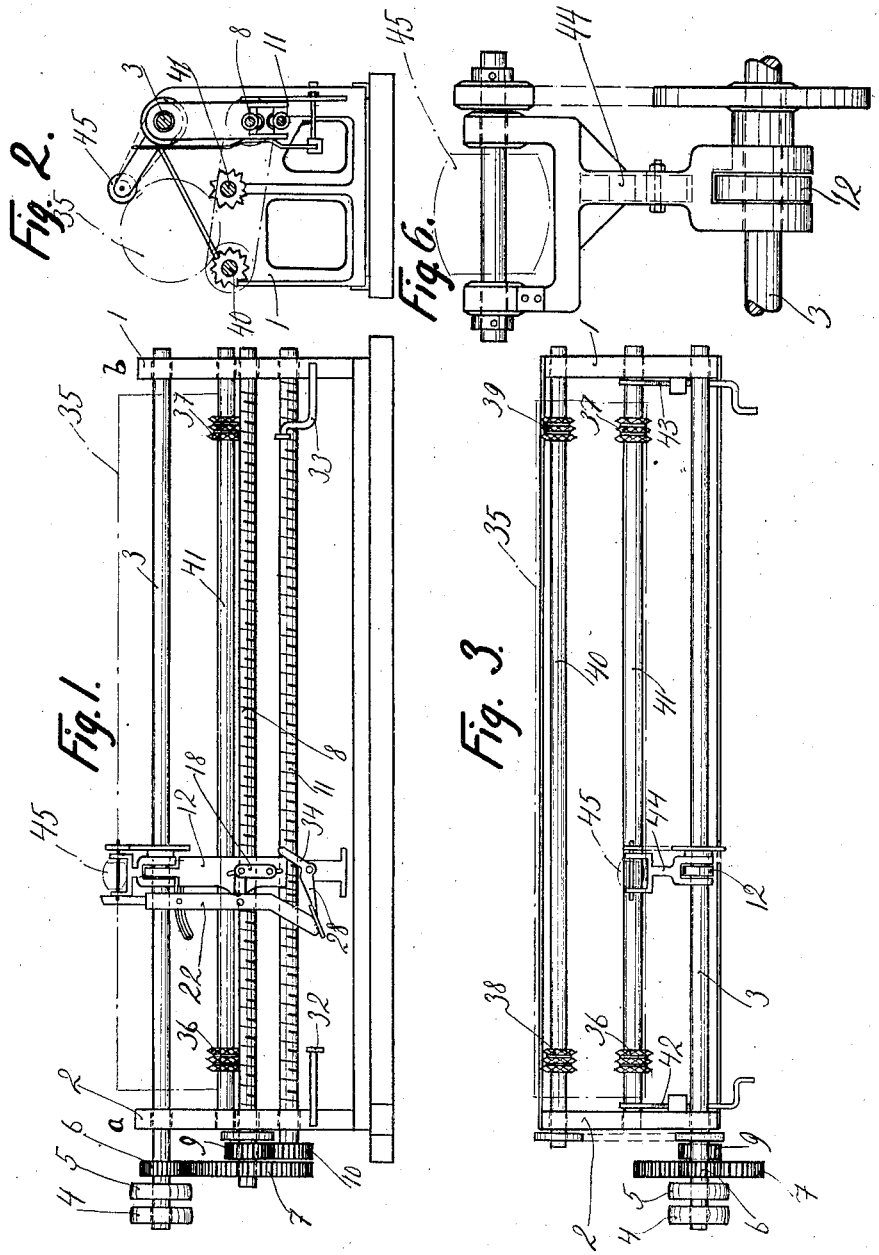

1,736,924

UNITED STATES PATENT OFFICE

KNUT ROBERT JOHAN LAGUS, OF ABO, FINLAND

BARK-REMOVING MACHINE

Application filed July 14, 1927, Serial No. 205,766, and in Finland August 9, 1926.

This invention relates to a transportable bark removing machine which is very light and easy for the worker to use, and with which a particularly effective removal of bark from the tree trunks is obtained.

A suitable embodiment of the invention is shown in the accompanying drawing. Fig. 1 shows the machine from the side, and Fig. 2 is a cross-section through the same. Fig. 3 is a plan view of the machine. Figs. 4 and 5 show in a larger scale and from two different sides a regulating device for the cutter movable to and fro in lengthwise direction of the work piece. Fig. 6 shows the cutter holder with the cutter.

The machine is provided with two end pieces 1, 2 wherein is journalled a rotatable shaft 3, which is provided with two pulleys 4, 5 which are situated outside the end piece 2 and which by means of a belt or the like (not shown) are connected with a suitable source of power. The pulley 4 is loosely mounted and the pulley 5 is securely mounted on the shaft 3. On the shaft 3 outside the end piece 2 is further fastened a toothed wheel 6 which engages another toothed wheel 7, which is securely mounted on a screw spindle 8 and extends parallel with and below the shaft 3. The screw spindle 8 is rotatably journalled in the end pieces 1, 2 of the machine. Outside the end piece 2 on the screw spindle 8 is fastened a toothed wheel 9 which engages an underlying toothed wheel 10, which is securely mounted on a screw spindle 11 rotatably journalled in the end pieces 1, 2. The screw spindle 11 is parallel with the spindle 8 and turns in an opposite direction thereto.

A block 12 is slidably mounted on the shaft 3 and is provided on its under side with a recess or hollow 13 defining depending legs 13ª. A nut 14 is movably confined between the legs 13ª and provided with upper threads 15, corresponding with the threads of the screw-spindle 8 and with lower threads 16 corresponding with the threads of the screw spindle 11 adapted to engage either of said spindles. As a means to move the nut 14 into operative relation to the spindles 8 and 11 a shaft 17 is inserted through the same, the ends of which shaft are jointedly connected with the lower ends of two links 18, 19 arranged one on each side of the sliding block 12. The upper ends of the links 18, 19 are joined with a clamp 20 which is movably connected with a lateral arm 21 on a two armed lever 22 which is turnable around a pin 23 which is in a projection on the sliding block 12. In order that the parts 17 and 20, may be raised and lowered grooves 24 for the shaft 17 and similar grooves 25 for the clamp 20 have been made in the sliding block 12.

On the sliding block 12 there is a downwards directed member 26 on which a shaft 27 is mounted and upon which shaft a hook 28 for the locking in one position the lever 22 is swingably arranged. The hook is provided with an inclined plane 29, at the upper end of which is a shoulder 30, with which the lower end of the lever 22 is intended to cooperate in one position of the lever. A spring 31 holds the hook 28 in the full line position shown in Fig. 4.

On one end piece 2 of the machine an abutment member 32, Fig. 1, is fastened and at the end of the movement in one direction of the sliding block 12 cooperates with the lower end of the lever 22, and on the end piece 1 is a similar abutment member 33, Fig. 1 is mounted and which at the end of the movement in opposite direction of the sliding block cooperates with an upwardly directed part 34, Figs. 1 and 4 on the hook 28.

The work piece (the tree trunk) 35, which is indicated by dash-dot lines in Figs. 1-3, rests on four spiked wheels 36, 37 and 38, 39, the two last mentioned of which are securely fastened on a rotatably driven shaft 40, Figs. 2 and 3 which is driven in a suitable way, for instance from the rotating screw spindle 8 by means of sprocket and sprocket wheels. Both the other spiked wheels 36, 37 are loosely journalled on a shaft 41 which is not rotatable and which is parallel with the shaft 40. The spiked wheels cause the work piece to turn round during the process of working. This shaft 41 can be moved to and from the shaft 40, for instance by means of two screws 42, 43, Fig. 3 provided with handles, in order that the distance between the shafts may be regulated according to the size of the work piece.

On the shaft 3 is adjustably arranged a holder 44 supporting a rotatable cutter 45. The part of the cutter holder 44 which is arranged on the shaft 3 is forked and encompasses the upper part of the sliding block 12, Figs. 3 and 6, so that the cutter holder with the cutter is caused to participate in the movement of the sliding block along the shaft 3. The rotation of the cutter is caused in a suitable way, for instance by means of two chain wheels and a chain from the shaft 3.

According to the drawing, the nut 14 when in middle position is out of engagement with both the screw spindles 8 and 11, Figs. 4 and 5. When one turns the lever 22 by hand in the direction of the arrow 46, Fig. 4, the nut 14 by means of the arm 21 and the links 18, 19 is raised upwards in the hollow 13 of the sliding block 12, so that the upper threads 15 in the nut come into engagement with the screw spindle 8. During this turning of the lever 22, the lower end of the lever slides out along the inclined plane 29 on the hook 28, whereby the hook by the pressure of the lever's end is swung downwards against the action of the spring 31. As soon as the end of the lever has passed the upper end of the inclined plane 29, where the shoulder 30 is, the hook 28 is again swung upwards by its spring 31, so that the end of the lever is blocked by the hook 28 and cannot pass the shoulder 30. The nut 14 is now held by the locked lever 22 in engagement with the rotating screw spindle 8. On account of the rotation of the screw spindle 8 the nut and also the cutter holder 44 is moved by the sliding block along the shaft 3, for instance from one end a of the machine to the other end b, Fig. 1.

When the sliding block 12 has come nearly to the end b of the machine, the upwardly directed part 34 of the hook 28 on the sliding block 12, strikes against the abutment 33, Fig. 1, whereby the hook 28 is swung downwards, so that the lever 22 is released. As soon as the lever 22 is released, the nut 14, owing to its own weight and the weight of the links 18, 19, (may be by the help of springs), slides out of engagement with the upper screw spindle 8 and slides down into engagement with the lower screw spindle 11, which, as said before, rotates in opposite direction to the screw spindle 8. The nut 14 and the sliding block 12 and the cutter holder are now moved by the spindle 8 back to the opposite end a of the machine, where the lower end of the lever 22 strikes against the abutment 32. The lower end of the lever is now turned in a direction to raise the nut 14 up into the position shown in Fig. 5 midway between the screw spindles 8 and 11. In this middle position the nut is not in engagement with either of the screw spindles 8, 11. The work piece from which the bark has been removed can now be removed and a new work piece put in and the lever 22 moved in the direction indicated by the arrow 46 in Fig. 4, so that the nut 14 is moved into engagement with the upper screw spindle 8, the lever 22 is held by means of the hook 28 and the described operation is again repeated.

Several variations of the shown and described devices are of course possible, without one's deviating from the important characteristics of the invention.

Having now described my invention, what I claim as new and desire to secure by Letters Patent is:

1. In a bark removing machine, comprising means for rotatably supporting a log from which the bark is to be removed, a travelling cutter, power driven disengageable means to move said cutter parallel to the axis of the log in either direction, and means to automatically engage and disengage said means during travel of the cutter, the last mentioned means including a hand lever directly connected with the disengageable means and operable to stop said cutter in any position thereof.

2. In a bark removing machine as claimed in claim in which the means for moving the cutter comprises a longitudinal spindle, a cutter carrier slidably mounted thereon, a pair of spaced parallel threaded spindles, means to rotate said spindles in opposite directions, a movable threaded member mounted on said cutter carrier adapted to engage either of said threaded spindles and means to move said threaded member into engagement with either of said threaded spindles or to neutral position therebetween, said threaded spindles and said threaded member operating to move said cutter carrier in either direction.

3. In a bark removing machine as claimed in claim 1 in which the means for moving the cutter comprises a longitudinal spindle, a cutter carrier slidably mounted thereon, a pair of spaced parallel threaded spindles, means to rotate said spindles in opposite directions, a movable threaded member mounted on said cutter carrier adapted to engage either of said threaded spindles and means to move said threaded member into engagement with either of said threaded spindles or to neutral position therebetween, said threaded spindles and said threaded member operating to move said cutter carrier in either direction, and in combination therewith of an abutment at an end of the machine adapted to engage said means to move the threaded member and move said threaded member to disengage it from one of said threaded spindles into its neutral position.

4. In a bark removing machine as claimed in claim 1 in which the means for moving the cutter comprises a longitudinal spindle, a cutter carrier slidably mounted thereon, a pair of spaced parallel threaded spindles, means to rotate said spindles in opposite directions, a movable threaded member mounted on said cutter carrier adapted to engage either of said threaded spindles and means to move said threaded member into engagement with either of said threaded spindles or to neutral position therebetween, said threaded spindles and said threaded member operating to move said cutter carrier in either direction, and in combination therewith of an abutment at an end of the machine adapted to move said threaded member from engagement with one of said threaded spindles into engagement with the other of said threaded spindles.

In witness whereof, I have hereunto signed my name.

KNUT ROBERT JOHAN LAGUS.